Jan. 7, 1941.   E. J. WHITE   2,228,068
INTEGRATING APPARATUS
Filed July 10, 1937   6 Sheets-Sheet 1

INVENTOR
ELISHA J. WHITE
BY
Franklin J. Bisbee
ATTORNEY

Jan. 7, 1941.  E. J. WHITE  2,228,068
INTEGRATING APPARATUS
Filed July 10, 1937  6 Sheets-Sheet 2

INVENTOR
ELISHA J. WHITE
BY
Franklin V. Pierce
ATTORNEY

Patented Jan. 7, 1941

2,228,068

UNITED STATES PATENT OFFICE 2,228,068

INTEGRATING APPARATUS

Elisha J. White, Dallas, Tex., assignor to Fairbanks, Morse and Company, Chicago, Ill., a corporation of Illinois Application July 10, 1937, Serial No. 152,903

10 Claims. (Cl. 235—61)

My invention relates to integrating apparatus adapted particularly for use in conjunction with a traveling belt conveyor co-operating with weighing scales and designed to continuously integrate certain variable quantities involving the speed of the traveling conveyor and the weight of the load, and to register the total weight of material transported by the conveyor belt during a definite period of time.

Another object is to provide certain co-operating elements, including a traveling conveyor belt carrying the material to be weighed, an angularly disposed driving cone operatively controlled by the conveyor, and an integrating wheel which is held constantly in rotative engagement with the driving cone and is, moreover, adapted to be shifted readily in a vertical plane along the surface of the driving cone and under the control of the freely movable weighing beam. Therefore, by this novel arrangement the integrating wheel is shiftable automatically on the surface of the driving cone from a zero position on its lower end to a point above in accordance with the weight of the load.

Thus the rate of speed of the driving cone controlled by and driven in unison with the conveyor element represents one of the variable quantities to be integrated, while the weight of the load as established by the weighing beam is representative of the other variable quantity.

An important object of the invention is to provide an efficient integrating unit comprising a continuously rotating integrating wheel which is frictionally driven by a revolving inverted driving cone in proportion to the speed of the conveyor belt as transmitted by a traction wheel in contact with the belt.

Another important object is to provide sensitive and continuously operating integrating means responding instantly to the varying load on a unit length of belt the traveling conveyor belt and integrating the weight of the load exactly as it is distributed over the conveyor belt and recording its correct weight however irregular the distribution of the load may be.

Another important object is to provide rotary integrating mechanism comprising a rotary make-and-beak electrical switch controlled by the integrating wheel and adapted to be rotated by the integrating wheel shaft in unison therewith, provided with a toothed cam wheel co-operating with a cam lever so positioned with relation to the teeth of the cam wheel as to successively engage the cam lever and to thus continuously close and open the electrical circuit from the rotary switch to a numerical register or counter proportional to the differential of speed and the number of cam teeth and levers employed. Thus by the alternate closing and opening of the circuit to the register, electric impulses denoting various unit capacities representing weight values, are produced, which impulses are set up accordingly in the register.

Another important object is to provide a weighing beam which is unimpeded and absolutely free in its movement and is adapted to control through the medium of an electric reversing motor the movement in a vertical plane of a movable integrating mechanism bracket carrying the integrating wheel and the beam likewise co-operates with means for reversing the motor and thereby moving the integrating wheel bracket up or down and changing accordingly the vertical position of the integrating wheel on the driving element.

Another important object is to provide means for effecting the differential in speed between the rotatable driving cone and the integrating wheel, by which all gears or cumbersome mechanism are entirely dispensed with, whereby the periphery of the integrating wheel is rendered vertically adjustable on the face of the driving cone in accordance with the position of a freely moving weighing beam co-operating with the integrating wheel, by which means the position on the periphery of the integrating wheel on the driving cone is quickly and automatically effected and its speed thereby varied.

Another object is to provide electrical impulse operated registering means under control of the integrating mechanism for automatically counting and totalizing a sequence of operations denoting different unit capacities representing weight values of the material being transported by the traveling conveyor belt.

Still another object is to provide actuating means for the register comprising an escapement mechanism operatively connected to the register and adapted to be operated by the electric impulses transmitted by the make-and-break switch, whereby the individual impulses are converted into unit capacities representing weight values, and are indicated on the register dials.

The present invention is believed particularly to incorporate certain well defined improvements in the art, as noted above, including a rotary switch carried by the integrating wheel for transmitting electrical impulses to a tonnage register for counting and registering the impulses, an inverted driving cone for driving the integrating wheel, and a freely moving unimpeded weighing beam. In the latter case the efficiency of the beam is greatly superior to beams heretofore generally employed, which perform other work as prime movers or carry parts of the integrating mechanism and are necessarily required to overcome the forces of gravity and inertia of these co-operating parts.

*Load conveyor and weighing mechanism*

Figure 1:
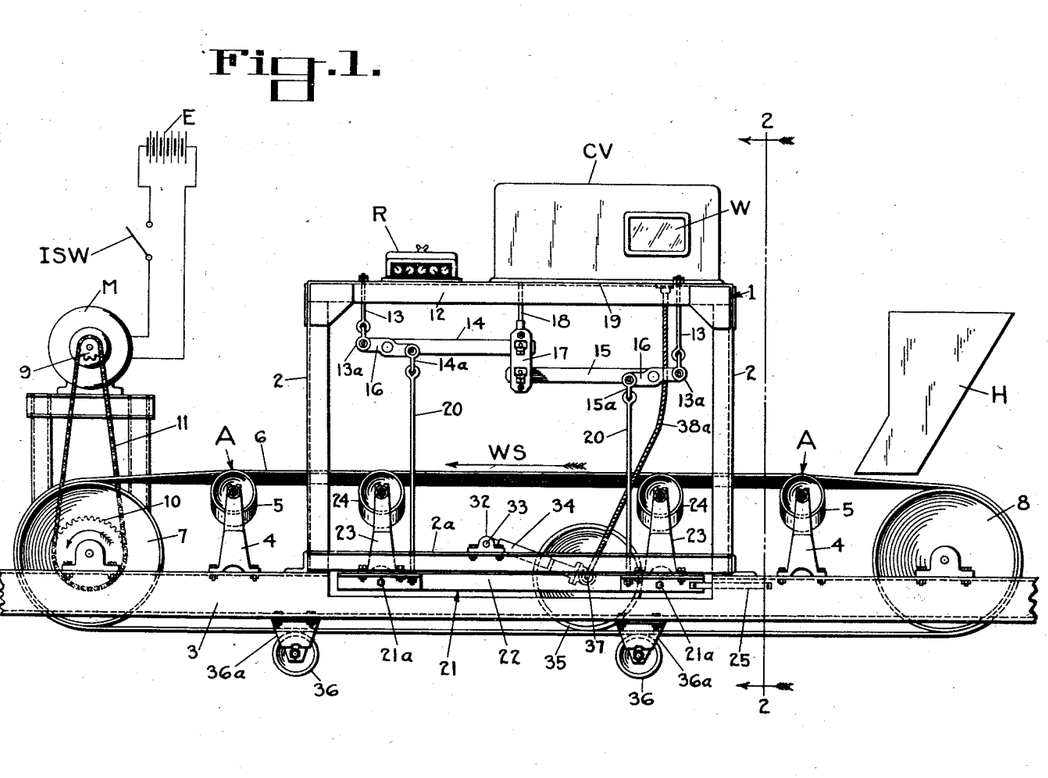
Figure 1 is a longitudinal elevation of the conveyor scale showing particularly the conveyor and weighing mechanisms of the apparatus.
Figure 2:
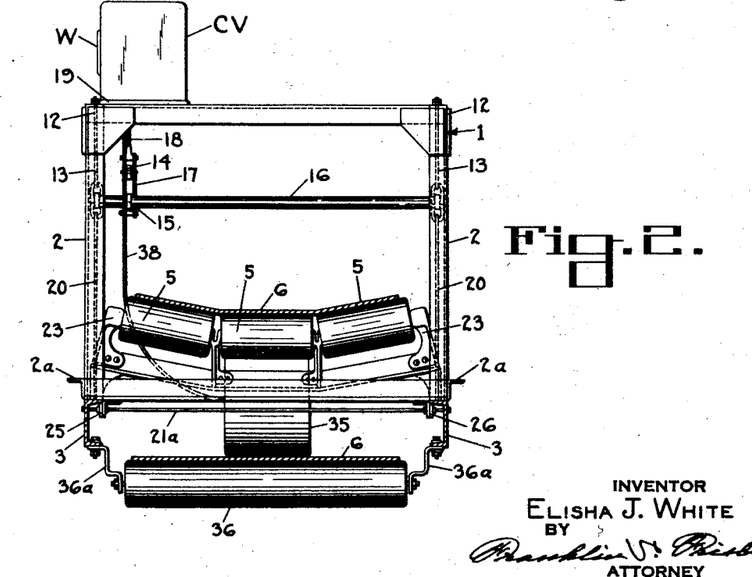
Figure 2 is an end elevation, partly in section, on the line 2—2 of Fig. 1.

Referring to the drawings, 1 designates a fixed frame which is supported by legs 2 mounted on spaced, fixed channel irons 3 forming part of the understructure. Disposed on the top side of the channel irons 3 and mounted on vertical and aligned brackets 4 are spaced groups of transverse trough-forming belt supporting rollers 5, over which runs a traveling conveyor belt 6, passing over a power roller 7 and an idler roller 8, the power roller 7 being driven by means of two spaced sprockets 9 and 10, carried respectively by an electric motor M and the traction roller 7 and co-operating with a sprocket driving chain 11 operated by an electric operating motor M (Fig. 1). Mounted in the top side rails 12 of the frame 1 are spaced pairs of depending hanger rods 13, each of which is pivotally attached by a loop 13a carried by a lateral pivot, to one of the co-operating spaced levers 14 and 15, which are attached to a pipe lever frame 16. The inner end of each extension lever 15 is pivotally attached to a center shackle 17, while the shackle depends from a draft rod 18 extending through an opening in an assembly plate 19 mounted on the frame 1 and connected to the weight indicating mechanism mounted on the assembly plate 19 (Fig. 1).

Figure 3:
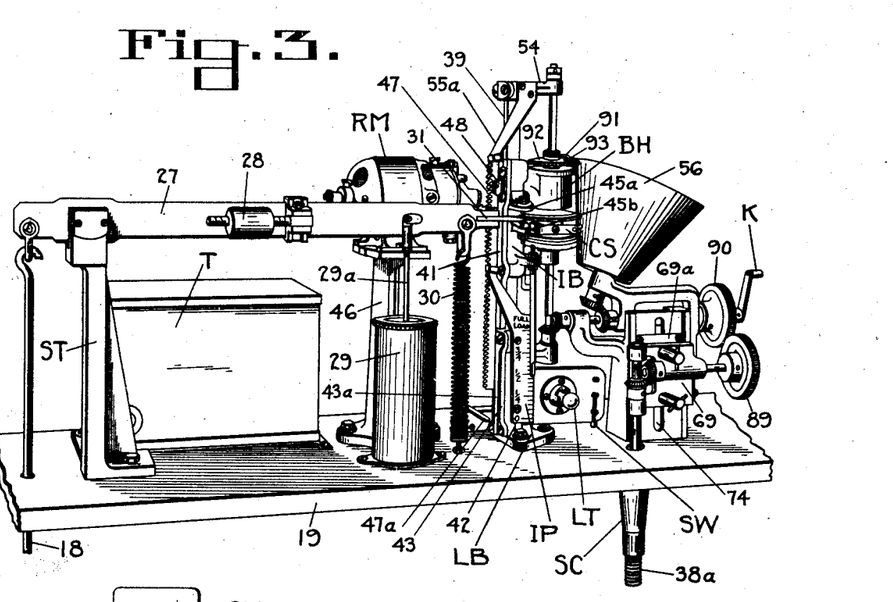
Figure 3 is an enlarged perspective of the integrating mechanism and co-operating parts.
Figure 4:
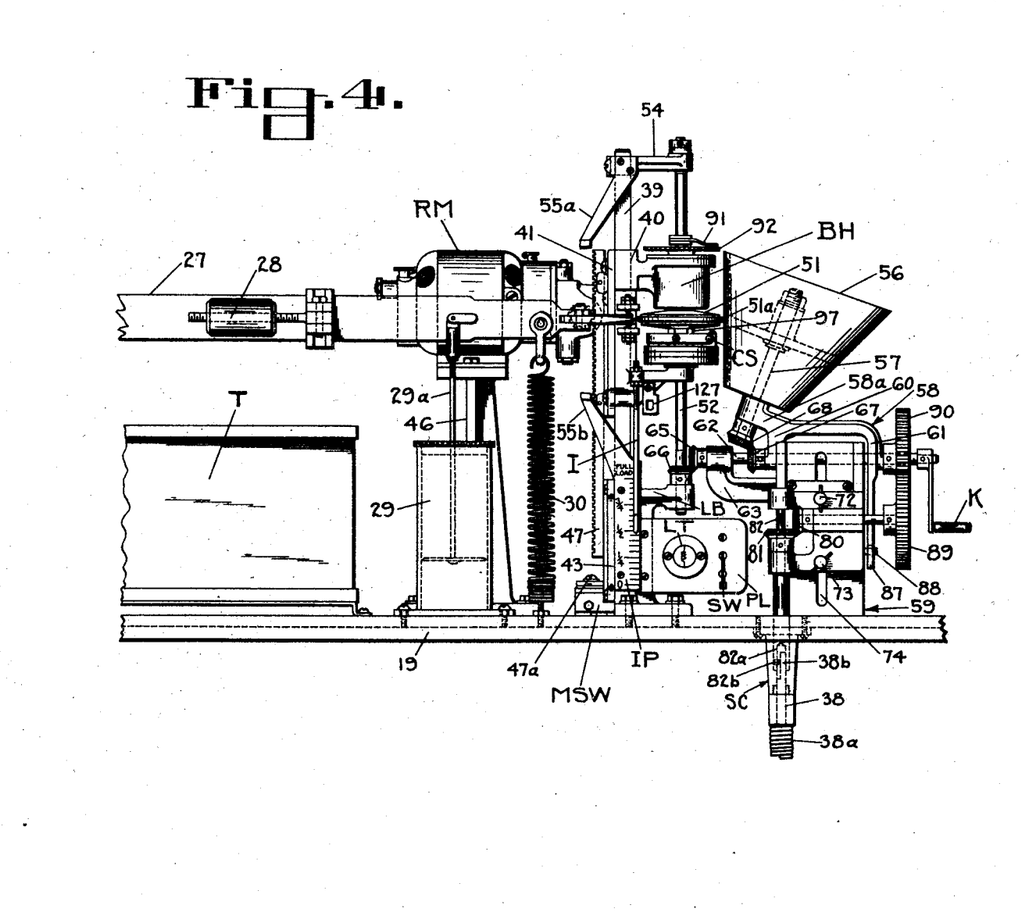
Figure 4 is an enlarged longitudinal elevation of the integrating mechanism.
Figure 5:
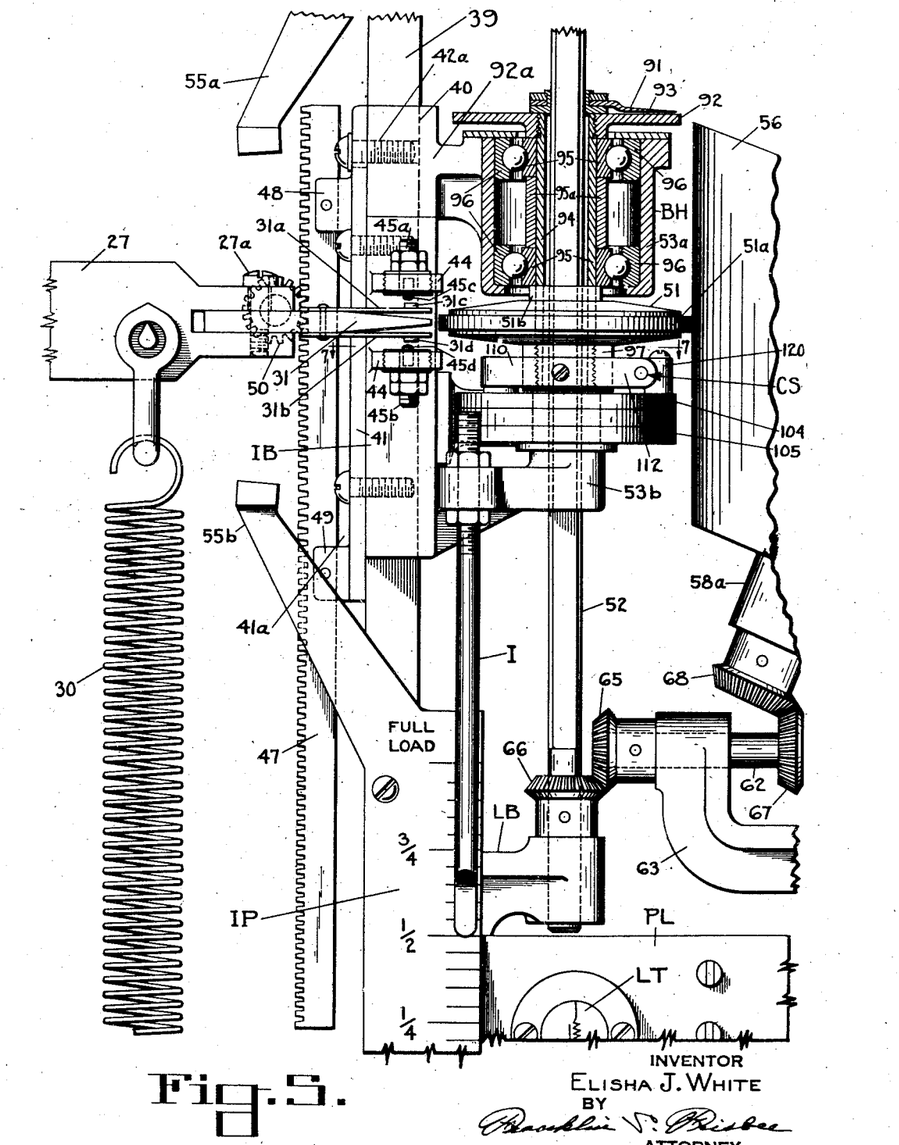
Figure 5 is an enlarged detail view, partly in section, of the integrating mechanism proper.

Extending downwardly from each lever 14 and 15 and pivotally attached by loops 14a and 15a respectively to a laterally extending pivot carried by each extension lever, is a suspension hanger rod 20, which is secured to a suspended, yieldable load supporting frame 21 held in position by tie rods 21a. Mounted on the side rails 22 of the suspended frame 21 are spaced pairs of brackets 23, carrying spaced trough-forming belt supporting rollers 24 on which the conveyor belt 6 travels over the yieldable frame 21, the surface of the rollers 24 being normally disposed in the same horizontal plane as the surface of the co-operating rollers 5 mounted on the channel irons 3. Check rods 25 and 26 are attached to the inner ends of the side rails 22 of the suspended frame 21. The draft rod 18, which is connected to the center shackle 17, is pivotally connected to the beam 27 of the weight indicating mechanism, the beam being pivotally mounted on a standard ST attached to the assembly plate 19 (Fig. 3). The beam 27 is provided with an adjustable and pivotally mounted counterpoise 28 for counterbalancing the dead load of the empty conveyor belt, also a dash pot 29 for dampening the movement of the beam and pivotally connected thereto by its plunger rod 29a. Adjacent to the tip end of the beam a calibrating spring 30 is attached, which is adapted to automatically balance the beam at a point proportional to the load on the scale. Inserted in the tip end of the beam 27 and securely held therein by a locking screw 27a is a contactor arm 31 of insulating material (Figs. 3, 4 and 5), which is provided on the top and bottom sides with opposed spring strips 31a and 31b and riveted thereto, each strip being provided with contacts 31c and 31d, preferably silver, and in circut with a reversing motor RM for moving and reversing the integrating mechanism as hereinafter described. The tip of the contractor arm 31 is tapered so as to allow the spring strips to yield when the contacts are in their operative positions.

In the determination of the weight of material supplied from a feed hopper H or other source of supply and carried by the conveyor bolt 6 the controlling factors are first the size of the stream of material deposited on the belt and second the speed with which it moves over a determined effective length of belt supporting the load between the selected fixed points A—A (Fig. 1), and actuating in its passage the load supporting frame of the weighing mechanism in transmitting the weight of the load to the beam 27.

Pivotally mounted in spaced bearing blocks 32 midway of the fixed side rails 2a of the fixed frame 1 is a transverse shaft 33, on which is pivotally mounted by an elongated bearing an inclined frame 34 having an extended central arm provided with forked arms at its free end between which is mounted a traction driving roller 35 adapted to engage the inside surface of the return side of the traveling conveyor belt 6, which travels over spaced underslung rollers 36 mounted in spaced brackets 36a on the under side of the channel irons 3. The shaft 37 of the traction roller 35 is operatively connected to the lower end of a flexible drive shaft 38, which is inserted in a flexible metallic casing 38a and by which means motion imparted by the conveyor belt 6 to the traction driving roller 35 is transmitted to the flexible shaft 38 and hence to the integrating mechanism located above on the assembly plate 19 in a predetermined ratio to the speed of the conveyor belt.

*Integrator assembly and driving mechanism*

The integrating mechanism (Figs. 3-5), which will be hereinafter described is slidably mounted in an integrating assembly bracket IB, which is adapted to slide on a vertical square-sectioned guide rod 39, which is seated in a longitudinal groove 40 in the assembly bracket IB and held in position therein by an upper retaining plate 41 attached to the inner side of the bracket, while the lower end of the guide rod 39 is held in a longitudinal groove 42 in the lower bracket LB and fixedly held therein by a lower retaining plate 43. The upper retaining plate 41 on the bracket IB is also provided with laterally extending spaced arms 44 extending from the front side of the bracket IB and carrying at their ends opposed contact screws 45a and 45b adjustably mounted in threaded insulated bushings and provided with contacts 45c and 45d, preferably tungsten, which serve as electrical contacts and are in circuit with a reversing motor RM (Figs. 3 and 4) fixedly mounted on an upright standard 46 attached to the assembly plate 19. Opposite the inner end of the reversing motor RM a vertical rack 47 is secured between spaced arms 48 and 49 on the upper retaining plate 41 held above and spaced from an elongated reinforcing rib 41a thereon, and is adapted to freely mesh with a pinion 50, which is operatively connected to the shaft of the reversing motor RM, the lower end of the rack being adapted to slide freely above an elongated reinforcing rib 43a in the lower retaining plate 43.

An integrating wheel 51 provided with a rubber tire 51a is slidably mounted on a vertical square-sectioned integrating wheel shaft 52, which shaft is adapted to rotate the integrating wheel 51 constantly in a clockwise direction. The integrating wheel 51 is disposed between spaced inwardly extending arms 53a and 53b carried by the integrating mechanism bracket IB, while the integrating shaft 52 is rotatively seated in a lateral arm 54 secured to the upper end of the guide rod 39 and in the upper arm of the lower bracket LB. An upper beam stop 55a is attached to the arm 54 and a lower beam stop 55b is integral with a graduated load indicator plate IP, with which co-operates an indicator I carried by an extension 53c of the arm 53b of the bracket IB for indicating the percentage of the load on the conveyor belt at the weighing station WS.

The function of the reversing motor RM is to cause the integrating mechanism bracket IB to be raised and lowered as the beam contacts 31c and 31d alternately engage the integrating mechanism bracket contacts 45c and 45d in accordance with the movement of the beam 27, which serves as a control member for controlling the vertical movement of the integrating bracket IB and the integrating wheel 51 under influence of the operative force of the load, whereby the electric circuit to the reversing motor RM is closed and the motor operated accordingly to raise or lower the rack 47 and consequently the integrating mechanism bracket IB with the integrating wheel 51.

The driving mechanism for the integrating mechanism (Figs. 3 and 4) comprises an inverted rotatable driving cone 56, which is disposed opposite the periphery of the integrating wheel 51, the face of the cone being adapted to constantly contact the rubber tire 51a of the integrating wheel and to thereby rotate the integrating wheel. The driving cone 56 is mounted on an inclined rotatable cone shaft 57, which is adapted to rotate the integrating wheel 51 continuously in a clockwise direction and is journaled in an upwardly extending, inclined cone supporting bracket 58 which is slidably mounted on a cone assembly standard 59 attached to the assembly plate 19.

Figures 6, 7, 8:
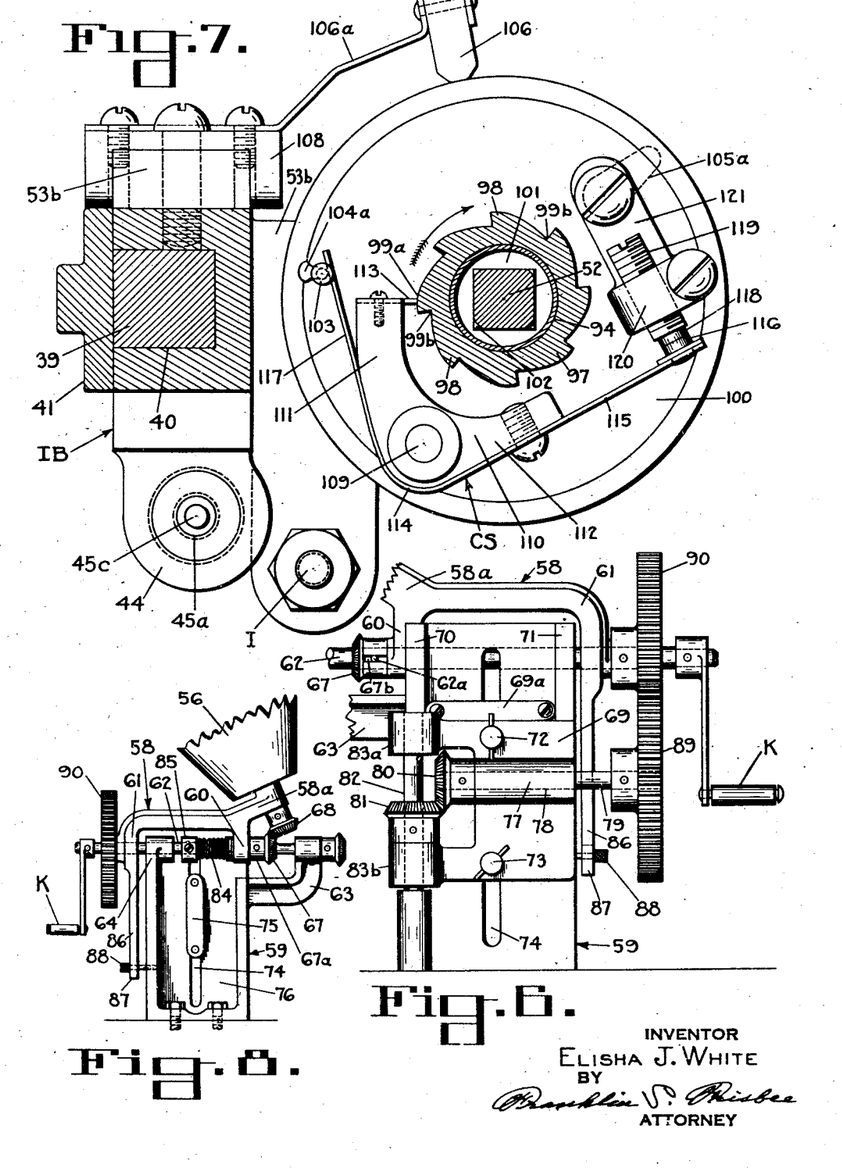
Figure 6 is a front elevation of the assembly bracket for the integrating driving mechanism.
Figure 7 is an enlarged top-plan view, partly in section, of the rotary electrical impulse switch of the integrating mechanism on the line 7—7 of Fig. 5.
Figure 8 is a rear elevation of the assembly bracket shown in Fig. 6.

The cone bracket 58 is mounted by its spaced depending arms 60 and 61 on a cone driving shaft 62, which in turn is journaled in the spaced arms 63 and 64 of the cone assembly standard 59 (Fig. 8) and yieldingly mounted therein as hereinafter described. In order to rotate the integrating wheel shaft 52 and the cone shaft 57 at a speed in unison with the speed of the conveyor belt 6, the inner end of the cone driving shaft 62 is provided with a miter gear 65, which meshes with a miter gear 66 attached to the integrating wheel driving shaft 52, while midway of the cone shaft 62 is resiliently mounted thereon a miter gear 67 which meshes with a miter gear 68 attached to the lower end of the cone shaft 57 revolvably mounted in an inclined arm 58a extending upwardly from the cone bracket 58. Thus by employing this driving means with the co-operating miter integrating gears 65 and 66 and the miter cone gears 67 and 68, the rotation of the integrating wheel shaft 52 and cone driving shaft 62 is synchronously maintained.

In operation the driving cone 56 is adapted to make one revolution for a predetermined number of feet of the conveyor belt's travel as existing between the load suspension points A—A (Fig. 1), and when the speed of the belt changes the speed of the driving cone changes accordingly with the speed of the belt.

The cone assembly standard 59 is provided with a vertically adjustable cone assembly front plate 69, which is slidable in spaced vertical guide-ways 70 and 71 and its upward position is limited by a transverse stop plate 69a in order to permit the proper operative engagement of the cooperating gears associated therewith as hereinafter described and thus prevent any jamming of the gears. The front plate 69 is held in its adjusted position by spaced holding screws 72 and 73 movable in a vertical slot 74 in the cone assembly standard 59 and carried by a slidable back plate 75, which is mounted on the back 76 of the cone assembly standard 59. Midway of the front plate 69 is an elongated longitudinal boss 77 having a bearing 78 therein, in which is mounted a main drive shaft 79 having at its inner end a miter gear 80 meshing with a similar gear 81 carried by a vertical drive shaft 82 disposed in spaced lateral lugs 83a and 83b, extending from the front plate 69 and attached to the upper end of the flexible shaft 38, by means of which the main drive shaft 79 is driven.

In order to render the cone bracket 58 variably and longitudinally adjustable with relation to the integrating wheel 51 so as to compensate for any wear of the rubber tire 51a of the integrating wheel, resilient means is provided by which the driving cone 56 and the integrating wheel 51 are maintained in constant operative engagement. This resilient, adjustable means comprises a spiral compression spring 84 mounted on the cone driving shaft 62, one end of which engages the depending cone bracket arm 60 and the other end an adjustable collar 85 secured by a set screw to the cone driving shaft 62. By this means the cone supporting bracket 58 under the influence of the coiled spring 84 is urged inwardly, carrying with it the resiliently mounted miter gear 67, the shank 67a of which gear is provided with an elongated slot 67b in which is located a pin 62a carried by the cone driving shaft 62, whereby the gear 67 will be resiliently held under urge of the spring 84 in constant engagement with the cone miter gear 68. Moreover, for the purpose of maintaining the driving cone 56 in its proper vertical position the cone bracket 58 is provided with an elongated arm 86 extending downwardly from its arm 61 and having a forked end 87, which engages and is held in a fixed position by a thumb screw 88.

Driving power is transmitted from the main drive shaft 79 to the driving cone 56 by means of a spur gear drive wheel 89 carried at the outer end of the main drive shaft 79, which meshes with a spur gear drive wheel 90 provided with a handle K and mounted on the outer end of the cone driving shaft 62. The speed of the spur gear wheels 89 and 90 may be varied as desired in relation to the speed of the traction drive wheel 35 by employing gear wheels of a selected ratio, which gear wheels in the present case are arranged in a gear ratio of 1 to 1. Thus the driving cone 56 and the integrating wheel shaft 52 are driven at a rate of speed which varies with the speed of the conveyor belt and is imparted to them by the flexible drive shaft 38, under operative control of the traction drive roller 35 engaging the conveyor belt 6 at the weighing station WS.

For the purpose of balancing the beam 27 and the adjustment by hand operation of the integrating wheel 51 in relation to the driving cone 56, the conveyor belt 6 is run without any load and the adjustable front plate 69 is loosened and lowered, thereby freeing from engagement the spur gear wheel 89 from the spur gear wheel 90, when the operator by using the handle K may readily turn the cone driving shaft 62 and thus operate the driving cone 56 and the integrating wheel 51 so as to make the necessary adjustments.

When the cone assembly front plate 69 is lowered a slip-connection SC permits the vertical drive shaft to be lowered also. The slip-connection comprises a tongue 38b extending upwardly from the upper end of the flexible drive shaft 38, which slides in an elongated tubular opening 82a in the lower end of the vertical drive shaft 82, while the tongue 38b is guided therein by a guide screw 82b. By this means the spur gear wheels 89 and 90 are readily disengaged and the vertical drive shaft 82 and the co-operating miter gears permitted to rotate idly. Attached to the upper end of the vertical integrating wheel shaft 52 is a pointer 91 which is located above a rotatable top plate 92 carried by the integrating mechanism and mounted over a fixed ball bearing housing BH carried by the integrating mechanism bracket IB, the housing forming part of a detachable upper section 92a of the bracket, whereby the housing BH with the integrating wheel 51 and cam wheel 97 may be removed for inspection or adjustment. The pointer 91 co-operates with an indicator line marked on the top plate 92 in indicating visually, as the pointer successively rotates by the line 93, the number of rotations of the integrating wheel 51 at its selected position on the face of the driving cone 56, in order to ascertain whether the speed of the integrating wheel 51 and the driving cone 56 are properly correlated to the speed of the conveyor belt 6.

*Integrating mechanism*

The integrating mechanism (Fig. 5) comprises essentially the vertically disposed rotatable integrating wheel shaft 52, as has been previously described, upon which is mounted the slidable integrating mechanism assembly bracket IB provided with the spaced inwardly extending arms 53a and 53b, between which is mounted the integrating wheel 51. The integrating mechanism bracket IB is raised and lowered in accordance with the load by the operation of the reversing motor RM as controlled by the movement of the beam 27, as hereinbefore noted. The integrating wheel is disposed in a horizontal plane between the arms 53a and 53b of the bracket IB and is secured midway of a tubular shaft 94, which is rotatable with the integrating wheel 51 and is mounted to freely rotate about the integrating wheel shaft 52 inserted therein, with ample clearance provided for the rotating tubular shaft. The upper end of the integrating wheel shaft 52 is rounded and is journaled in the upper lateral arm 54 attached to the upper end of the guide rod 39 and has its lower end rounded and journaled in the upper spaced arm of the lower bracket LB which is secured to the assembly plate 19. The tubular shaft 94 of the integrating wheel 51 has mounted at its upper end the top plate 92 rotating therewith, together with radially extending ball bearing raceways 95 seated in a ball bearing housing BH and press fitted on the tubular shaft 94, the lower raceway engaging an annular boss 51b on the top side of the integrating wheel. The raceways 95 are spaced apart by a collar 95a and are opposed to spaced raceways 96 press fitted in the ball bearing housing BH, which is carried by the arm 53a of the bracket IB and is located at the upper end of the tubular shaft 94, whereby this mounting permits the integrating wheel 51 to rotate freely.

Attached to the lower end of the tubular shaft 94 of the integrating wheel 51 is a rotatable make-and-break circuit breaker cam switch-actuator wheel 97, which is adapted to rotate at a speed proportional to the load on a unit length of the conveyor belt 6 and controlling one quantity to be integrated the cam wheel 97 is provided with a plurality of contactor teeth or cam members 98 and bowed edges 99a, eight teeth or cams in number as required for the present integrator, and provided with notches 99b, which cam wheel rotates in a clockwise direction and in unison with the integrating wheel 51. Below the integrating wheel 51 is located a circuit breaker switch CS (Fig. 7), which includes a rotatable, circular cup-shaped switch and commutator mounting, which is revolvably mounted on the integrating shaft 52 and adapted to rotate in the same clockwise direction as the cam wheel 97 and at a fixed speed with relation to the travel of the conveyor belt 6 and controlling the other quantity to be integrated. Normally with no load on the belt the cam wheel 97 and the switch mounting 100 rotate in unison, but with a load on the belt the speed of the cam wheel 97 is increased accordingly and runs ahead of the switch mounting 100 and thereby operates the switch CS as hereinafter described. The switch mounting 100 is made preferably of Bakelite or other suitable insulating material. The switch mounting 100 is moreover, provided with a metal hub and bushing 101 having a central rectangular opening 102 through which the integrating wheel shaft 52 extends and on which the switch and commutator mounting is rotatably mounted. The switch base plate 100, which is fixedly secured to the bracket arm 53b, has mounted on its upper side a fixed upright contact post 103, while above the switch mounting 100 the cam wheel 97 is adapted to rotate. Around the external periphery of the switch mounting 100 are mounted upper and lower copper electrical commutator or collector rings 104 and 105 in circuit and in constant engagement with contactor carbons 106 and 107, which are adapted to direct the electric current to the register R for its operation. The contactor carbons are resiliently mounted on spring strips 106a and 107a attached to spaced arms 108 secured to the lower arm 53b of the assembly bracket IB and in circuit with the register R, as previously described.

Pivotally mounted on a pin 109 carried by the switch mounting 100 is an L-shaped cam switch lever 110, which is provided with a long arm 111 and a short arm 112, the long arm 111 having attached to its outer end an insulated transversely disposed hardened steel cam contactor arm 113 adapted to be successively engaged by the cams 98 in alternately opening and closing the circuit and thereby transmitting electrical impulses. Attached to the switch lever 110 is an L-shaped co-operating leaf tension spring 114 having its long arm 115 provided with a tungsten contactor disc 116 and its short arm 117 adapted to be held under tension by constant engagement with the fixed contact post 103. The contactor disc 116 carried by the long arm 115 of the leaf spring 114 is adapted to operatively engage an opposed stationary tungsten contactor disc 118 inserted in a screw 119, which is mounted in a boss 120 of a bracket 121 attached to the switch mounting 100. Electric conductor links 104a and 105a lead from the collector rings 104 and 105 respectively to the contact post 103 and the bracket 121 carrying the contact disc 118, by which means the current is transmitted to the register R. A cover CV encloses the integrating mechanism and co-operating parts and the cover is provided with a window W through which the load indicator plate IP and the electric bulb LT are plainly visible.

Thus when a load is placed on the conveyor belt 6 and consequently the integrating wheel 51 is raised on the driving cone 56 the speed of the cam wheel 97 is accelerated over that of the mounting, so that the cam wheel runs ahead of the switch CS. Thus as the cam wheel 97 rotates, starting with the contact arm 117 in its inoperative position in a cam tooth notch 99b, upon the apex of each cam tooth shoulder 99a successively engaging the contact arm 113 of the switch (Fig. 7), the long lever arm 111 carrying the contact arm is caused to be pushed outwardly thereby swinging inwardly the associated spring long arm 115, carried by the short lever arm 112, with its contactor disc 116. By this movement of the short lever arm 112 the contactor disc 116 is brought into engagement with the opposed contactor disc 118 and thus the circuit to the lower collector ring 105 is closed and sending an electric impulse to the register R for recording, the circuit to the upper collector ring 104 by way of the contact post 103 being constantly closed. Upon the contact arm 113 riding over a cam tooth shoulder 99a the contact arm descends into a cam notch 99b and thus the tension of the spring 114 is reduced and the long arm 115 of the spring with its contactor disc 116 is swung outwardly, thereby breaking the contact with the stationary contact disc 118 and opening the circuit to the register R. By the alternate opening and closing of the circuit by the contactor discs 116 and 118 electric impulses are produced, the duration of each of which corresponds to the time required for the cam contact arm 113 of the cam lever 110 to ride along and off the particular cam 98 of the cam wheel 97 into the succeeding cam notch 99b. The number of contacts made for each revolution of the driving cone 56 is always in proportion to the load on the conveyor belt 6 and each revolution of the driving cone is effected by a definite unit of length in the suspended belt travel as measured by the traction roller 35. The electric impulses thus produced by the operation of the switch CS are transmitted to actuate a solenoid controlling an escapement driver of an electrically operated actuating mechanism (not shown), which is operatively connected to the continuous tonnage register R, which is provided with direct-reading dials 122—126 denoting various unit capacities, such for example as ten-hundredths of units 122, units 123, tens of units 124, hundreds of units 125, and thousands of units 126. Thus integration is actually a system of counting so that, for example, if 400 contacts are made by one ton of material carried by the conveyor belt in a unit of time, one-half ton would produce 200 contacts, one-quarter ton 100 contacts, etc., the weight value of each contact being five pounds or .0025 of a ton. It is to be noted that each impulse, one for each cam 98, represents a unit value denoting selected and predetermined weight values and the number of successive contacts for each revolution of the rotary switch CS varies in rate per minute proportionately to the load on the scale and speed of the conveyor belt.

*Operation of the conveyor and integrating mechanism*

In the operation of the integrating mechanism a variation of the load on the conveyor belt 6 will cause the beam 27 to move accordingly and thus close the circuit, the beam constituting a freely moving, unimpeded element and in no way acting as a prime mover, thereby causing the reversing motor RM to rotate in the particular direction that will cause the bracket IB to be moved up or down in a vertical plane. Thus the beam 27 serving as a control member carries the integrating wheel 51 with it along over the face of the driving cone 56 in the same direction as the beam 27 is moving under the influence of the operative force of the load. Since the driving cone 56 is disposed in an inverted position with the expanded end at the top the speed of the integrating wheel 51 increases proportionately as it is moved upwardly. When the beam 27 is in balance and the conveyor belt 6 is running with no load, the beam 27 moves to its lowest or zero position, while the integrating wheel 51 will be positioned at its lowest position and hence their ratio will be as one to one. Further, since the rotating tubular shaft 94 which carries the cam make-and-break cam wheel 97 is revolving constantly at the same speed as the driving cone 56, all three correlated members when positioned at their lowest or zero position, namely the driving cone 56, the integrating wheel shaft 52, and the cam wheel 97 of the rotary switch CS, are all rotating in unison. Moreover, while the cam wheel 97 carried by the integrating wheel 51 and the rotary switch CS at this time are rotating in the same clockwise direction and at the same speed, the cams 98 will be inoperative. But if the speed of the cam wheel 97 is increased, due to the integrating wheel 51 being moved to a higher point on the cone, the speed of the rotary switch CS remaining constant, the cam wheel 97 will run ahead of the rotary switch CS and will actuate the cam switch lever 110 to alternately open and close the contactor discs 116 and 118 and thus alternately open and close the circuit, as previously described, thereby producing successive electrical impulses proportional to the differential of the speeds of the cam wheel 97 and the rotary switch CS.

Thus in the operation of the apparatus, the material is fed onto the belt 6 from the feed hopper H or other source of supply and on reaching the weighing station WS (Fig. 1) it will cause the beam 27 to rise, thus carrying its contactor arm 31 upwardly so as to engage the upper contact screw 45a and thus close the circuit to operate the reversing motor RM, thereby moving upwardly the integrating mechanism bracket IB, the integrating wheel 51 and rotary switch CS until the load is balanced and the contact is broken. When the load has been weighed and passes on the conveyor belt beyond the weighing station WS the beam 27 with the integrating wheel 51 is lowered accordingly and they are again raised as an increased load on the belt reaches the weighing station WS. Therefore, since the load of material fed to the conveyor belt 6 is constantly varying, the beam 27, responding to the varying load, so moves the beam contactor arm 31 as to cause its movable contacts 31c—d to engage the proper fixed contact 45c or 45d and thus cause the reversing motor RM to shift the position of the integrating wheel 51 to the point on the driving cone 56 where its revolutions will be proportional to the load at the moment the conveyor belt 6 is passing over the weighing station WS. The scale is so calibrated that the full calculated load on the scale will cause the beam 27 to be moved upwardly to a point where the integrating wheel 51 will be positioned on a diameter of the driving cone 56, which would be twice the diameter of the integrating wheel 51 itself, thereby giving the integrating wheel two full revolutions, while the driving cone 56 and the rotary switch CS would be completing one revolution. Thus with eight cams 98 provided on the cam wheel 97, as in the integrator shown in the drawings, at full load eight contacts, makes and breaks, or impulses would be obtained for each revolution of the driving cone 56 and the rotary switch CS, at three-quarters load six contacts, one-half load four contacts, and one-quarter load two contacts and when required a proportional number of contacts is provided for any other fractional load. The electrically controlled actuating mechanism of the register (not shown) is geared to the register R at the correctly calculated ratio to convert the contacts or impulses into units of weight and to register and totalize them on the register dials 122—126.

When the beam 27 and integrating wheel 51 reach their zero positions the lower end of the rack 47 (Figs. 3 and 4), moving downwardly with the integrating mechanism bracket IB, engages the arm 41a of a micro switch MSW serving as a safety device, and thereby shuts off the current to the register R and stops it, by which means the register is prevented from running when the conveyor belt is without a load or the beam is not in true balance.

Figure 9:
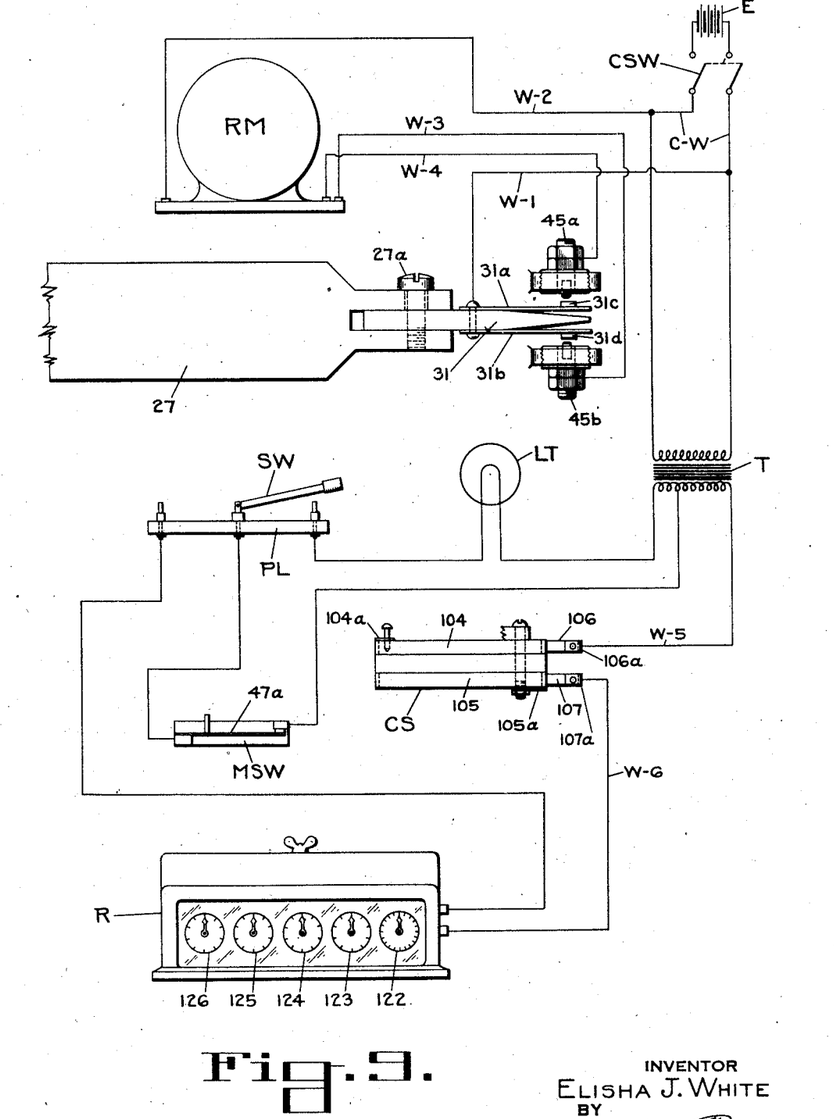
Figure 9 is a diagrammatic view showing the electric circuits employed in the operation of the apparatus, together with the integrating tonnage register.

In the electrical circuit, shown in the wiring diagram, Figure 9, an electric cable CW connected to a current control switch CSW in circuit with an electric supply source E leads to a transformer T and the reversing motor RM, and hence to the collector ring contactors 104 and 105 of the integrating mechanism and hence to the register R. An independent control switch ISW in circuit with the operating motor M (Fig. 1) and a source of electricity E serves to control the operation of the motor M and the conveyor belt 6. One common circuit wire W—1 is conducted along the inner side of the beam 27 and connected to the contacts 31c and 31d of the beam contactor arm 31, while the other wire W—2 goes to the reversing motor RM. Two wires W—3 and W—4 lead from the reversing motor RM to the two adjustable contact screws 45a and 45b carried by the integrating mechanism bracket IB and by the engagement of one of these contacts with one of the beam contacts 31c or 31d, the circuit is closed, thereby operating the reversing motor RM and causing the motor to rotate in either direction in accordance with the up or down movement of the beam 27. In the integrating mechanism circuit wires W—5 and W—6 lead respectively from the contactors 106 and 107, contacting the collector rings 104 and 105, which wires are in circuit through the conductor links 104a and 105a, with the register actuating mechanism (Fig. 9). A loop 127 attached to the integrating mechanism bracket IB serves to carry the electric wires associated with the rotary integrating switch CS, in order to prevent any interference therefrom with the operation of the integrating mechanism. A double-throw switch SW mounted on a vertical plate PL secured to the assembly plate 19 serves to control the circuit to the register R and to an electric test bulb LT in the plate PL. By this means the rotary switch CS may be operated so as to shut off the register when desired and to light the bulb, and thus for testing purposes indicate by the light flashes of the bulb the number of contacts for the full load or fractional part thereof made by the switch and also indicate the resulting electrical impulses transmitted in a given time by the integrating mechanism.

While the preferred embodiment of the invention herein shown and described is well adapted to fulfill the objects of the invention, it is to be understood that it is not intended to confine the invention to the precise form of construction herein disclosed, for it is susceptible of modification in various forms, all coming within the scope of the invention.

I claim:

1. A rotary interrupter switch assembly adapted for use with an integrating mechanism, and including a rotary cam-like element characterized by a plurality of peripheral interrupting zones, an electric circuit connected with a register or the like, in which circuit the interrupter is disposed, a rotatably mounted breaker arm assembly including an arm and a pair of contacts, the assembly being disposed for rotation in coaxial, actuated relation to the cam-like element, and adapted to make and break the circuit responsive to differential rotation between the cam-like element and breaker arm, a pair of spaced commutator or collector rings mounted in insulated relation about the breaker arm assembly, a brush engaging each of the rings, the brush and rings being located in said register circuit as conducting portions thereof, and separate mechanical connections for respectively driving said breaker arm assembly and the cam element thereof at speeds proportionate to the respective quantities of the function to be integrated.

2. In a rotatable circuit interrupter assembly adapted for use in an integrating apparatus, as for influencing an electrical impulse transmission circuit, a cylindrical housing, an insulating plate carried within and by the housing, a circuit breaker assembly carried by the plate, a cam for actuating the circuit breaker assembly, a cam operating wheel located axially beyond the housing, and independent drive means for the insulating plate together with parts carried thereby, for the cam, said drive means arranged, respectively, for rotating the circuit breaker assembly and the cam, at speeds proportionate to the respective quantities of the function to be integrated.

3. In a circuit interrupter assembly adapted for producing a succession of electrical impulses as in an impulse transmitting circuit, a rotatable cylindrical housing, a circuit breaker assembly carried by and within the housing, a cam for operating the breaker assembly, the cam being rotatably mounted within, but separate from the rotatable mounting of the housing and circuit breaker elements, a drive wheel located endwise and exteriorly of the housing and rotatively secured to the cam, means for rotating the cam and cam drive wheel at a speed proportionate to one of the quantities of the function to be integrated, means for rotating the housing with the breaker assembly at a speed proportionate to another of the quantities of the function to be integrated, and means providing an energized circuit in which the circuit breaker assembly is electrically arranged.

4. In a rotary interrupter switch assembly adapted for use with integrating apparatus as for influencing an electrical impulse register, a rotatable housing, a spring-actuated switch arm carried within the housing, a stationary contact in the housing coacting with said switch arm, a cam within the housing arranged in actuating relation to the switch arm, a cam-drive wheel exteriorly of the housing and operatively connected to the cam, a pickup ring carried exteriorly of the housing, brush means coacting with the ring, and an energized circuit for transmitting the impulses created by circuit interruptions of said assembly, the pickup ring, brush means and switch parts being arranged in said circuit.

5. The combination recited by claim 4, including a pair of spaced pickup rings externally carried by the housing, and a brush for each of said rings, with the brushes and rings arranged in the recited circuit.

6. In a rotary interrupter switch assembly adapted for use with an integrating mechanism or the like in an energized impulse transmission circuit, a shallow cylindrical housing, an insulating plate in the housing, a circuit breaker assembly carried by the plate including a breaker arm and a coacting contact, a cam for actuating the breaker assembly, characterized by a saw-tooth periphery, a cam follower element characterized by an edge portion engaging the periphery of the cam, a cam-actuating wheel beyond the housing, and means for independently rotating the cam wheel, and the housing together with the circuit breaker assembly, each at speeds proportionate to the respective quantities of a function to be integrated.

7. In a rotary interrupter switch assembly adapted for use with an integrating mechanism or the like, a rotatable cylindrical housing, a circuit breaker carried by the housing and in insulated relation thereto, a cam in the housing but arranged for rotation with respect thereto, means for rotating the cam, independent means for rotating the housing and circuit breaker assembly with the breaker assembly in actuated relation to the cam, and mounting means enabling the housing, cam and circuit breaker assembly to be axially shifted during operation, whereby the cam and drive therefor may be placed in selected positions with respect to a variable-speed cam actuating agency.

8. In a rotary interrupter switch assembly adapted for use with an integrating mechanism or the like in an impulse transmission circuit, a rotatable cylindrical housing, a circuit breaker arm and contacts mounted within the housing, a cam within the housing in operating relation to the circuit breaker arm, independent means for rotating the housing and parts carried thereby, and for rotating the cam, whereby the housing and cam may be respectively driven at speeds proportionate to the respective quantities of a function to be integrated, the cam being characterized by a ratchet-type periphery and the breaker arm including a cam follower element coacting with the teeth of the cam to provide for relative rotation of the cam and breaker assembly in only one direction.

9. In a circuit breaker assembly adapted for use in an integrating apparatus, as for influencing an electrical impulse register, a rotatable mounting plate, a circuit breaker arm and coacting contacts carried by the plate, pickup rings enclosing the plate, circuit breaker arm and contacts, brushes coacting with the pickup rings, a hollow shaft extending through the mounting plate, a cam drive wheel and a cam on said hollow shaft, the cam arranged for actuating the circuit breaker arm, an actuating shaft for the mounting plate and parts carried thereby, said actuating shaft being operable within the hollow shaft, means for axially shifting along the actuating shaft the several other recited elements, whereby to adapt the assembly for axial displacement to impart to the cam drive wheel different speeds of rotation corresponding to one of the quantities of the function to be integrated, circuit-forming elements in which the circuit breaker, contacts, pickup rings and brushes are arranged, and means including said actuating shaft and hollow shaft for independently rotating said mounting plate and associated elements, and said cam, respectively at speeds proportionate to the respective quantities of a function to be integrated.

10. In a circuit breaker assembly adapted for use in an integrating apparatus, as for influencing an electrical impulse transmission circuit, a vertically disposed, rotatable cylindrical housing, a mounting plate in the housing and formed of insulating material, a pivoted circuit breaker arm carried by the plate, a contact carried by said arm and a coacting contact carried by said plate, pickup rings mounted peripherally and externally of the housing, brushes externally of the housing and engaging the pickup rings, a hollow vertical shaft extending axially of the housing, a cam drive wheel and a cam carried by the hollow shaft, the cam being in operating relation to the circuit breaker arm, an actuating shaft for rotating the housing together with the circuit breaker elements therein, the actuating shaft being operable in the hollow shaft, means for axially shifting the cam, cam wheel, hollow shaft, mounting plate, and elements thereon vertically and along the actuating shaft whereby to permit the cam wheel to assume different positions so as to be driven by a cooperating driving element at different speeds, and means forming an electrical impulse transmitting circuit containing the circuit breaker arm, contacts, rings and brushes.

ELISHA J. WHITE.